United States Patent [19]
Davis

[11] 3,729,091
[45] Apr. 24, 1973

[54] FISHING LINE DISPLAY-DISPENSER

[76] Inventor: Lester M. Davis, 1565 Center Street, Gig Harbor, Wash. 98409

[22] Filed: Dec. 31, 1970

[21] Appl. No.: 103,149

[52] U.S. Cl.............206/44.11, 206/45.29, 206/59 A, 206/78 B
[51] Int. Cl. ....B65d 79/00, B65d 73/00, B65d 75/42
[58] Field of Search.......................206/44.11, 45.29, 206/45.31, 59 A, 78 B, 80 A

[56] References Cited

UNITED STATES PATENTS

| | | | |
|---|---|---|---|
| 2,212,630 | 8/1940 | Anderson | 206/45.29 |
| 2,690,593 | 10/1954 | Abercrombie | 206/80 A UX |
| 1,494,006 | 5/1924 | Morrison | 206/45.31 |
| 2,500,446 | 3/1950 | Worden | 206/59 A |
| 3,253,705 | 5/1966 | Stoker | 206/80 A |
| 3,303,930 | 2/1967 | Hyland | 206/78 B |
| 3,347,356 | 10/1967 | Kossnar | 206/45.29 |
| 3,187,889 | 6/1965 | Sinclair | 206/78 B UX |
| 3,352,412 | 11/1967 | Draving et al. | 206/59 A |

*Primary Examiner*—Leonard Summer
*Attorney*—Clinton L. Mathis

[57] ABSTRACT

A fishing line display-dispenser is disclosed comprising a container having a top opening and a top panel movable into and out of closing position therewith. Within the container are a plurality of rectangular, two-ply cards standing on their ends. A transparent display cover is carried by each card and each comprises a circular or disc-shaped face, cylindrical side walls, and a flanged base. The face and side walls of the display cover extend through an opening in the card and the flanged base is adhered to the inner surface of the front ply of a card. The front wall of the container has an opening therein and the foremost card carries a display cover which is vertically movable into and out of registration with the opening in the front wall of the container. When in registration, the display cover projects through and outward of the front wall of the container. The size and shape of each display cover mates with the opening in the front wall of the container and each is preferably at least a fragment of a circle. A reel of fishing line is disposed in each display cover. The starting and terminal ends of the fishing line of each reel are brought out as free ends and into the space between the plies forming such cards and outwardly therefrom. The free terminal end of each reel extends to and is a continuous line with the free starting end of the fishing line on the next succeeding card in the container.

2 Claims, 3 Drawing Figures

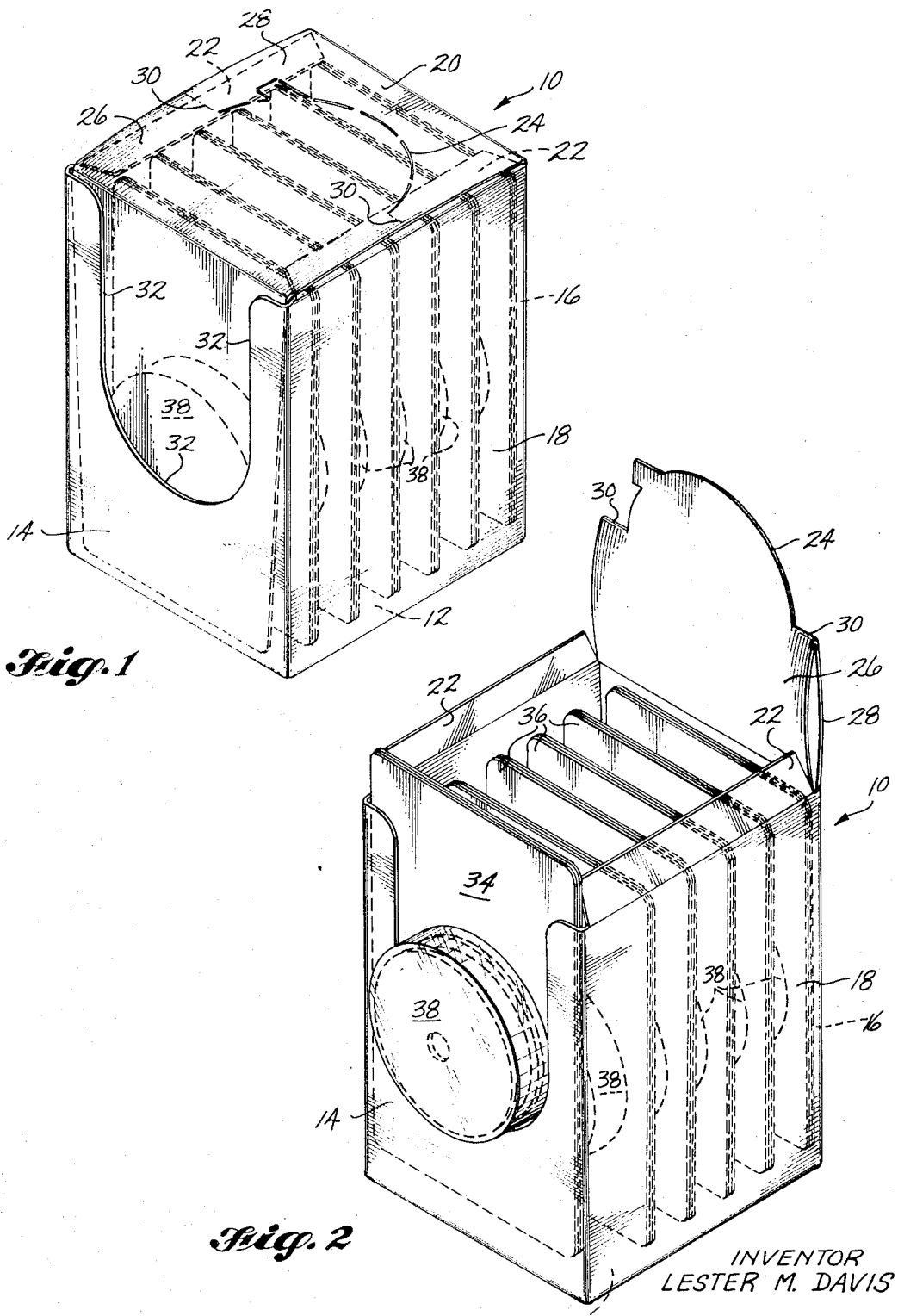

Patented April 24, 1973

INVENTOR,
LESTER M. DAVIS
BY
ATTORNEY

FISHING LINE DISPLAY-DISPENSER

My invention relates to a fishing line display-dispenser. More particularly, my invention relates to such a device which, not only displays fishing lines for sale, but also displays them in a manner so that fishing line can be dispensed in units of continuous lengths, such as units of 100 yards each and with one to six units of continuous lengths of line as desired.

It is an object of my invention to provide a fishing line display-dispenser comprising a container for receiving therein rectangular cards standing on their ends in an upright position and where each card supports a display cover projecting forwardly therefrom.

It is a further object to provide such cards in the form of two-ply cards, with a hole in the front ply, with the display cover projecting through said hole, and with the display cover adhered to the inside face of the front ply.

It is a further object to provide display covers in the form of a transparent member comprising a disc or circular front face, cylindrical side walls, and a laterally projecting base member and wherein fishing line reels are disposed in said display covers.

It is a further object to provide reels of fishing line in said display covers where the starting and terminal ends of fishing line on said reels on said cards are brought out as free ends and into the spaces between the plies forming the cards and where the free terminal ends of each reel on a card extend to and are a continuous line with the free starting end of the reel on the next succeeding card.

Other objects of my invention will become explicit or implicit as the description thereof proceeds in detail in connection with the accompanying drawings, wherein like reference numerals refer to like parts, and wherein:

FIG. 1 is a perspective view of a closed container embodying my invention, showing in full lines the container and with dotted lines, reels of fishing line supported by cards in said container;

FIG. 2 is a similar view showing the structure of FIG. 1 but showing the top cover moved to display position and with the foremost reel also moved to display position.

Figure 3:
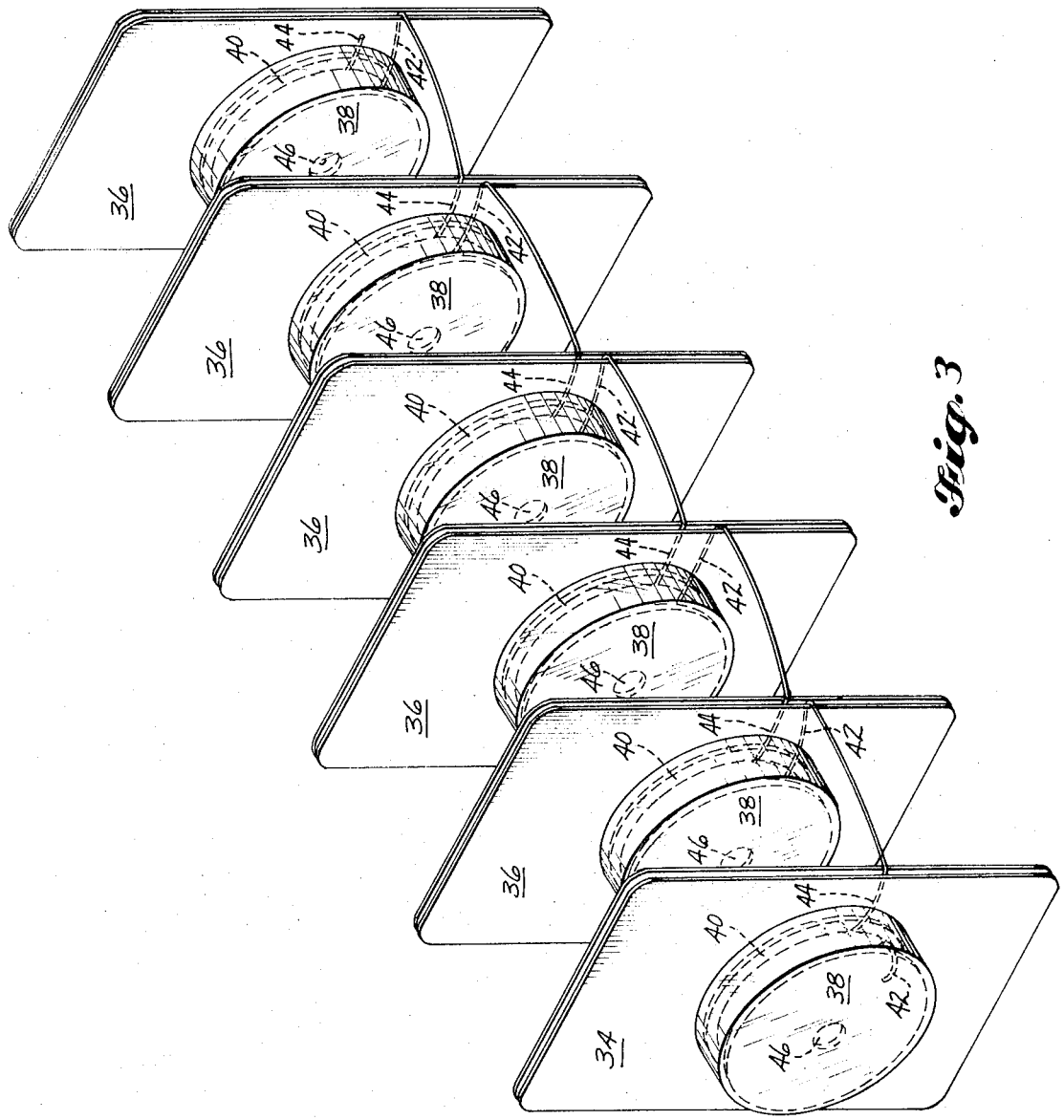
FIG. 3 is a perspective view, on a larger scale, showing the cards and reels of fishing line and with the container removed.

A container, generally numbered 10, comprises a bottom panel 12, a front panel 14, a rear panel 16, side panels 18, and a top panel 20. The container 10 is preferably in the form of a parallelepiped to better fit with the enclosures thereof hereafter described. Preferably, the upper ends of the side panels 18, each terminate in a flap 22. The flaps 22 extend in a horizontal plane when the top panel 20 is moved to the closed position, as depicted in FIG. 1, and extend in vertical planes when the top panel or cover is moved to display position, as depicted in FIG. 2. Also preferably, the top panel 20 has a broken cut line 24 permitting portions 26 and 28 thereof to be folded along fold lines 30 and with the major portion 26 of the top panel 20 tucked into the container 10 and disposed adjacent the inside surface of the rear panel 16. Also, the inside surface of the part 26 of the top panel 20 will serve as a media for advertising display, such as the name of the trader, the trademark of the goods, the suggested sales price, and the like.

The front panel 14 is provided with an opening 32 which is shown as comprising parallel side walls terminating at the bottom in a semicircular wall. During shipment, the part 26 of the top panel 20 extends partially across the top of the flaps 22 (then in a horizontal plane) and thence downwardly inside the front panel 14 and closing the opening 32 in the front panel 14 — as illustrated in FIG. 1.

During display (as illustrated in FIG. 2), the part 26 of the top panel 20 is vertical to display advertising carried thereby and also the foremost card 34 of the cards 36 is moved vertically to the position shown in FIG. 2. The cards 36 and card 34 comprise a plurality of cards disposed in upright position in the container 10. Each of the said cards carries a transparent display cover 38 and a reel 40 of fishing line is disposed in each display cover. The foremost card 34 is moved upwardly and the contour of the display cover 38 is circular to mate with the circular portion of the opening 32 in the front panel 14 and thus the display cover 38 on the foremost card will interfit with and project through the lower portion of the said opening 32. This will position the display cover 38 on the foremost card 34 (or any subsequent foremost card) to good advantage as a transparent display cover 38 (and the reel of fishing line 40 displayed through the transparent cover) will project outwardly and forwardly of the container 10.

Each of the cards 34, 36 is preferably formed of card material, as cardboard, folded on itself to provide two plies with a joining fold line. A hole is provided in the front ply of each card 34, 36 and a display cover 38 is projected through such a hole (from the inside of a card to the outside thereof) and then the base of the display cover 38 is adhered to the inside face of the front ply of a card 34, 36. When the two plies of a card 34, 36 are separated, a reel of fishing line 40 may be inserted or removed from a display cover 38 and then as the two plies of the card are urged together a line of fishing reel 40 will be retained in a display cover 38.

In reeving fishing line onto reels 40 to be disposed within display covers 38, two free terminal portions are provided, namely, the terminal end portion 42 of fishing line and the start-end portion 44. Such end portions 42 and 44 are preferably brought out from a fishing line reel 40 into the space between two plies forming a card 36 and 34 supporting the display cover 38 enclosing such a reel. Also, the starting end portion of a fishing line of a reel 40 on a card 34 extends from between the plies forming such a card 34 to the space between the plies forming the preceding card, or a card 36, and is continuous with the fishing line on the reel 40 supported by such a card 36. Also, the terminating end portion 42 of each reel of a fishing line supported by a card 36 extends outwardly and between the plies forming such a card and such terminating end portion 42 is continuous with the starting end portion 44 supported by the next succeeding card, as card 34.

Fishing line is commonly sold in reels which are 100 yards or multiples thereof. Thus, with the example depicted in the drawings, fishing line may be vended in 100 yard units up to 600 yards. Supposing it is desired to vend and thereafter reel 200 yards of fishing line onto a fisherman's pole reel, then the fishing line between the starting end 44 of the reel 40 supported by the first card 36 (the card 36 next preceding card 34)

and the terminal end 42 of the reel 40 supported by the second card 36 (the card 36 next preceding the said first card 36) will be severed. Then the two plies forming the said card 34 and the said first card 36 will be separated and the two reels 40 of the fishing line removed from their display covers 38. Each of the reels 40 is provided with a center opening 46. After removal of a plurality of reels 40 (in the supposed instance of two) are mounted on spindle (such as an ordinary lead pencil) by inserting the spindle through the holes of all the reels 40 involved. Then the fishing line is reeved off the reel 40 (the reel formerly supported by the card 34) with the terminating end 42 leading to the starting end of the reel on the fisherman's pole. As the line is reeled onto such reel, both reels 40 (or such other number as may be employed) are permitted to rotate on the spindle until the fishing line is exhausted from the first reel 40 and from each subsequent reel on the spindle. In the foregoing manner units of fishing line from one unit, for example 100 yards per unit, up to the capacity of the display (here shown as six units) can be vended and the same sold as a continuous line which can be readily reeled onto a common reel. While a device for dispensing more than six units is mechanically practical, I have found that the common demand is for units of 100 yards each and for selected units from one to six thereof.

From the foregoing it will now become apparent that I have illustrated and described a fishing line display comprising a container 10, which is preferably in the form of a parallelepiped, for receiving therein rectangular cards 34, 36 standing on their ends and in upright positions. A transparent display cover 38 is carried by each of the cards 34, 36. Preferably, each of the cards 34, 36 is of a two-ply construction, with the front ply having a hole therethrough, and with a display cover 38 secured to the front ply, as by being adhesively secured to the the inside face of said front ply, and which display cover covers said hole. A reel of fishing line 40 is disposed in each of the display covers and is inserted or removed by separating the two plies forming a card 34, 36. The fishing line reel 40 is held in place by maintaining the two plies in contact with each other. Next, the front wall or panel 14 is provided with an opening 32 which is normally out of registration with the display cover 38, which is preferably transparent, on the foremost card 34. The size and shape of the display cover 38 is mated with the size and shape of the opening 32 permitting the frontmost card 34 and the cover 38 carried thereby to move into and out of registration with the opening 32. Thus, when the top panel is moved to closed position (as shown in FIG. 1), the foremost display cover 38 will be below the opening 32 in the front panel 14 and the container may be closed. However, when a display is desired, the foremost card 34 may be raised (as shown in FIG. 2) and the display cover 38 (having a reel 40 mounted thereon) will project through said opening 32 in the front wall of panel 14. Preferably, the display cover 38 is stiffer as it is desired to enclose the reel of fishing line 40 therein. Likewise, the lower portion of the opening 32 in the front panel is at least a fragment of a circle, so as to mate with the shape of the display cover 38. The reels 40 of fishing line are wound so that the starting ends 40 and the terminating ends 42 are brought out as free ends and the starting end of each reel 40 connects with and is continuous with the terminating end of the next preceding reel and likewise, the terminating end of each reel connects with and is continuous with the starting end of each succeeding reel 40. Such free end line portions preferably extend into the space between the plies of each card 34, 36 supporting a reel 40 and from there to the next preceding or succeeding card 34, 36. Also, the display covers 38 are preferably in the form of transparent units having a disc or circular front, cylindrical side walls, and a base flange and of a size to permit ready insertion through an opening in the front ply of a card 34,36 and further have a base portion of a size which will prevent displacement of a cover inserted into a hole in the front ply of a supporting card.

Obviously changes may be made in the forms, dimensions, and arrangements of the parts of my invention without departing from the principle thereof, the foregoing setting forth only a preferred form of embodiment of my invention.

I claim:

1. A fishing line display-dispenser comprising a parallelepiped shaped container for receiving therein a plurality of rectangular cards standing on their ends and in upright positions and parallel to the front wall of the container; a plurality of cards disposed in upright positions in said container and parallel to the front wall of the container; a transparent display covered carried by and projecting forwardly from the front of each card, spacing the cards from each other and from the front wall of the container; and a reel of fishing line disposed in each display cover, said container being provided with a front wall with an opening therein normally above and out of registration with the display cover on the frontmost rectangular card, and the size and shape of each display cover being mated with the size and shape of the opening in the front wall of the container permitting the frontmost card and the display cover carried thereby to move upwardly into and downwardly out of registration with such opening.

2. The combination of claim 1, wherein said display cover is circular in section and the walls defining said opening in the front wall of the container are at least a fragment of a circle.

* * * * *

UNITED STATES PATENT OFFICE
CERTIFICATE OF CORRECTION

Patent No. 3,729,091  Dated April 24, 1973

Inventor(s) Lester M. Davis

It is certified that error appears in the above-identified patent and that said Letters Patent are hereby corrected as shown below:

Column 4, claim 1, line 7, "covered" should read -- cover --.

Signed and sealed this 14th day of May 1974.

(SEAL)
Attest:

EDWARD M. FLETCHER, JR.
Attesting Officer

C. MARSHALL DANN
Commissioner of Patents